(12) United States Patent
Garg

(10) Patent No.: US 9,916,327 B2
(45) Date of Patent: Mar. 13, 2018

(54) SYSTEM AND METHODS FOR REMOTE IMAGE ACQUISITION AND REMOTE IMAGE PROCESSING OF A DOCUMENT

(71) Applicant: Acuant Inc., Culver City, CA (US)

(72) Inventor: Varun Garg, Los Angeles, CA (US)

(73) Assignee: ACUANT, INC., Los Angeles, CA (US)

( * ) Notice: Subject to any disclaimer, the term of this patent is extended or adjusted under 35 U.S.C. 154(b) by 0 days.

(21) Appl. No.: 14/682,118

(22) Filed: Apr. 9, 2015

(65) Prior Publication Data
US 2015/0293915 A1 Oct. 15, 2015

Related U.S. Application Data

(63) Continuation of application No. 61/978,829, filed on Apr. 12, 2014.

(51) Int. Cl.
*G06K 9/18* (2006.01)
*G06F 17/30* (2006.01)

(52) U.S. Cl.
CPC .............. *G06F 17/30256* (2013.01)

(58) Field of Classification Search
CPC ............................................... G06F 17/30256
USPC ........................................................ 382/182
See application file for complete search history.

(56) References Cited

U.S. PATENT DOCUMENTS

| | | | | |
|---|---|---|---|---|
| 6,850,252 B1* | 2/2005 | Hoffberg | ............ | G06K 9/00369 348/E7.061 |
| 2003/0217005 A1* | 11/2003 | Drummond | ............ | G06F 3/023 705/43 |
| 2007/0288247 A1* | 12/2007 | Mackay | ................. | G06Q 10/00 705/1.1 |
| 2009/0212104 A1* | 8/2009 | Smith | ................. | G06Q 20/042 235/379 |
| 2011/0178861 A1* | 7/2011 | Georgi | ............... | G06Q 30/0224 705/14.25 |
| 2013/0148862 A1* | 6/2013 | Roach | .................... | G06Q 40/02 382/112 |

* cited by examiner

*Primary Examiner* — Samir Ahmed
(74) *Attorney, Agent, or Firm* — Polsinelli PC

(57) ABSTRACT

A document processing system for remote processing an image frame of a document and methods of using thereof. The system includes a remote server, having a processing unit and a data repository unit. The system further includes a personal mobile device having an image acquisition device for acquiring at least one image frame of a document, a communication unit adapted to communicate with the processing unit and an image-transmission-management module. Upon receiving the at least one image frame of a document by the remote server from the personal mobile device, via the wireless network, the processing unit extracts textual data, image data or both from the received at least one image frame to thereby create extracted data; associates an access code to the extracted data; and stores the at least one image frame, the extracted data and the associated access code in the data repository unit.

20 Claims, 4 Drawing Sheets

SYSTEM AND METHODS FOR REMOTE IMAGE ACQUISITION AND REMOTE IMAGE PROCESSING OF A DOCUMENT

FIELD OF THE INVENTION

The present invention relates to a system and methods for remote processing an image of a document and more particularly, the present invention relates to a system including a mobile device for acquiring at least one digital image frame of documents such as ID documents, remote server for extracting data from the imaged document and a receiving device adapted to receive the extracted data after being authenticated.

BACKGROUND OF THE INVENTION

There exist in today's market imaging devices capable of reading documents such as ID cards, driver's license, business cards, passports, medical cards and the like, and including booklet-type documents such as passports. Such imaging devices are capable of automatically extracting data from the imaged document.

On the other hand, there exist in today's market a plethora of mobile devices, such as mobile phones, tablets and computerized cameras, capable of acquiring images of documents, but not to locally process and extract data from an imaged document.

There is therefore a need and it would be advantageous to facilitate the processing and extraction of data from an imaged document acquired by a common mobile device.

SUMMARY OF THE INVENTION

The principle intentions of the present invention include a system for remote processing an image of a document acquired by a mobile device, transmitting the image frame to a remote processor, such as a cloud processor, to thereby extract dada from that image frame. The extracted data is then stored in a data repository operatively coupled with the cloud processor, along with a unique access code associated with the extracted data. The extracted data may then be obtained by a user, using a remote computerized device, from the data repository, after providing the matching access code.

The terms "access code" and "authentication code" are used herein interchangeably.

According to the teachings of the present invention, there are provided a document processing system for remote processing an image frame of a document and methods of using thereof. The system includes a remote server, having a processing unit and a data repository unit. The system further includes a personal mobile device having an image acquisition device for acquiring at least one image frame of a document, a communication unit adapted to communicate with the processing unit and an image-transmission-management module. Upon receiving the at least one image frame of a document by the remote server from the personal mobile device, via the wireless network, the processing unit extracts textual data, image data or both from the received at least one image frame to thereby create extracted data; associates an access code to the extracted data; and stores the at least one image frame, the extracted data and the associated access code in the data repository unit.

The document may be an ID document, wherein ID documents may include, with no limitations, ID cards, business cards, checks and receipts, as well as booklet-type documents such as passports. The at least one digital image frame, along with a coupled access code, are transmitted to a remote server such as a grid/cloud server that processes the at least one digital image frame so as to extract data from the imaged document with machine vision tools. A remote computerized receiving device that is operatively connected to the remote server, may request the extracted data, sending along with the request the access code, and after the access code is authenticated, the remote server sends the extracted data to the receiving device.

Preferably, the access code is generated by the processing unit and sent to the image-transmission-management module. The access code may be uniquely assigned to the personal mobile device. In some embodiments, upon receiving the at least one image frame, the access code may be associated with each the received image frame. In other embodiments, upon receiving the at least one image frame the access code is associated with each sequence of the received image frames.

Optionally, the access code may be generated by the image-transmission-management module and sent to the remote server along with the at least one image frame. The access code may be associated with each the at least one image frame. In other embodiments, the access code may be associated with each sequence of the at least one image frame. In other embodiments, the access code is uniquely assigned to the personal mobile device.

Preferably, the document processing system further including at least one remote computerized device that is in communication flow with the remote server and wherein a user of the remote computerized device, upon requesting to obtain the at least one image frame from the remote server, provides the access code associated with the at least one image frame in order for the remote server to send the at least one image frame to the remote computerized device.

Optionally, the remote computerized device is the personal mobile device.

According to further teachings of the present invention, there are provided methods for remote processing an image of a document acquired by a mobile device by a remote processor such as a cloud processor, to thereby extract dada from that image frame.

In some embodiments, the document processing method for remote processing an image frame of a selected document includes the steps of:
  a. providing a document processing system whereas the processing unit is preconfigured to generate the access code;
  b. by the image acquisition device, acquiring at least one image frame of a selected document;
  c. by the image-transmission-management module, transmitting the at least one image frame to the remote server;
  d. by the processing unit, providing an access code associated with the at least one image frame;
  e. by the processing unit, transmitting the access code to the image-transmission-management module;
  f. by the processing unit, processing the at least one image frame and thereby extract textual and/or image data from the at least one image frame; and
  g. by the processing unit, storing the extracted textual and/or image data from in the data repository unit.

In one embodiment, the access code is uniquely assigned to the personal mobile device. In one embodiments, the access code is associated with the at least one image frame.

In some embodiments, the document processing method for remote processing an image frame of a selected document includes the steps of:

a. providing a document processing system whereas the image-transmission-management module is preconfigured to generate an access code;
b. by the image acquisition device, acquiring at least one image frame of a selected document;
c. by the image-transmission-management module, providing an access code associated with the at least one image frame;
d. by the image-transmission-management module, transmitting the at least one image frame and associated access code to the remote server;
e. by the processing unit, processing the at least one image frame and thereby extract textual and/or image data from the at least one image frame; and
f. by the processing unit, storing the extracted textual and/or image data from in the data repository unit.

An aspect of the present invention to provide a method for retrieving the extracted data stored in the data repository that is operatively coupled with the cloud processor, wherein the extracted data stored along with a unique access code associated with the extracted data.

The retrieving method includes the steps of:
a. sending a request to obtain the at least one image frame from the remote server by a user using a remote computerized device that is in communication flow with the remote server;
b. sending the access code associated with the at least one image frame to the remote server along with the request.
c. by the processing unit, authenticating the access code; and
d. upon determining that the received access code matches the access code associated with the at least one image frame, sending the at least one image frame to the remote computerized device.

The retrieving method may further including the step of deleting the at least one image frame after the sending the at least one image frame to the remote computerized device.

BRIEF DESCRIPTION OF THE DRAWINGS

The present invention will become fully understood from the detailed description given herein below and the accompanying drawings, which are given by way of illustration and example only and thus not limitative of the present invention, and wherein.

DETAILED DESCRIPTION OF THE INVENTION

The present invention will now be described more fully hereinafter with reference to the accompanying drawings, in which the preferred embodiments of the invention are shown. This invention may, however, be embodied in many different forms and should not be construed as limited to the embodiments set forth herein; rather, these embodiments are provided, so that this disclosure will be thorough and complete, and will fully convey the scope of the invention to those skilled in the art.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. It is understood that the phraseology and terminology employed herein is not to be construed as limiting and are for descriptive purpose only.

Methods of the present invention may be implemented by performing or completing manually, automatically, or a combination thereof, selected steps or tasks. The order of performing some methods step may vary. The descriptions, examples, methods and materials presented in the claims and the specification are not to be construed as limiting but rather as illustrative only.

Meanings of technical and scientific terms used herein are to be commonly understood, unless otherwise defined. The present invention can be implemented for testing or practice with methods and materials equivalent or similar to those described herein.

Figure 1:
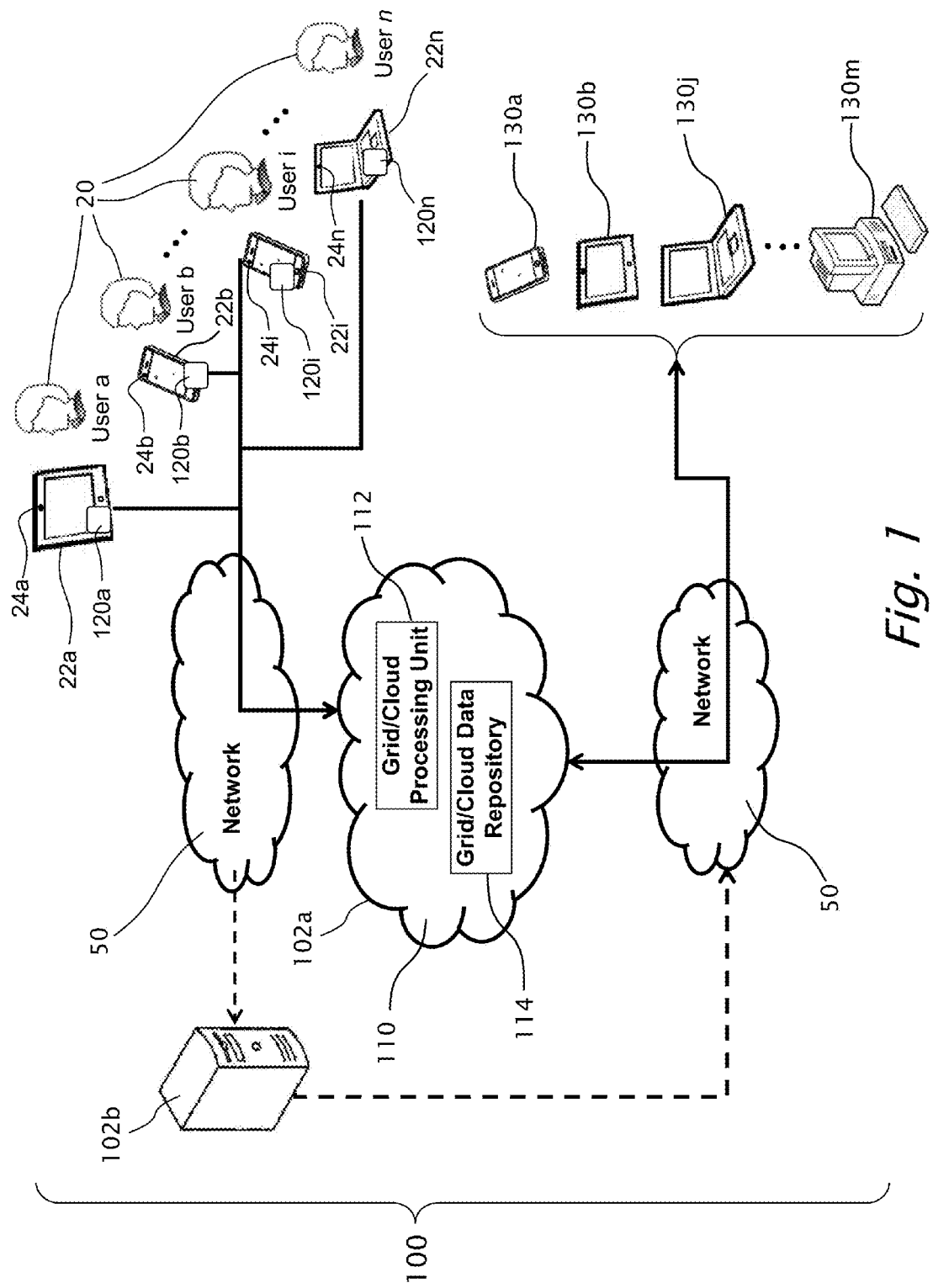
FIG. 1 is a general schematic block diagram illustration of the components of a document processing system for remote processing an image of a document, according to an embodiment of the present invention.

Reference is now made to the drawings. FIG. 1 is a general schematic block diagram illustration of the components of a document processing system 100, according to an embodiment of the present invention. Document processing system 100 includes a remote server 102 that may be a remote document processing server 102b of a provider of document processing services. Server 102 may also be in the form of cloud/grid computing system 102a that is referred to herein, with no limitation, as the server 102. Server 102 includes a processing unit 112 and a data repository unit 114.

Document processing system 100 may be used by one or more users 20, each coupled with a personal mobile device 22, capable of acquiring an image frame, and being in communication flow with a wireless network 50 such as an internet network and having an image-transmission-management module 120, activated thereon. Personal mobile device 22 is in communication flow with remote server 102 over a wireless network 50, including an internet network.

In some embodiments of the present invention, a user $20_i$ acquires at least one image frame by personal mobile device $22_i$ and sends the at least one image frame, by image-transmission-management module $120_i$, to remote server 102. Processing unit 112 is preconfigured to generate an authentication code for each image frame or for a predefined group of images that have been transmitted to remote server 102. The authentication code is sent to image-transmission-management module $120_i$ by processing unit 112 for processing.

In some other embodiments of the present invention, image-transmission-management module 120 is preconfigured to generate an authentication code for each image frame or a predefined group of images transmitted to remote server 102. In other embodiments of the present invention, image-transmission-management module 120$_i$ assigns an access code that is associated with the hosting mobile device 22$_k$, to all image frames acquired by mobile device 22$_i$, to be transmitted to remote processing unit 112 for processing.

In some other embodiments of the present invention, user 20$_i$ and his/her personal mobile device 22$_i$ are pre-registered users of remote server 102. In such embodiments, remote processing unit 112 may assign a unique access code to personal mobile device 22$_i$, upon registration to services provided by remote server 102.

Document processing system 100 may further include at least one remote computerized device 130 that is in communication flow with remote server 102 over a wireless network 50. A user of a computerized device 130 may request to obtain an image frame from server 102, provided he/she supplies the authentication code associated with the requested image frame or group of images. Only if the authentication code associated with the requested image frame or group of images is provided, will remote server 102 send the requested data to the respective remote computerized device 130.

Figure 2A:
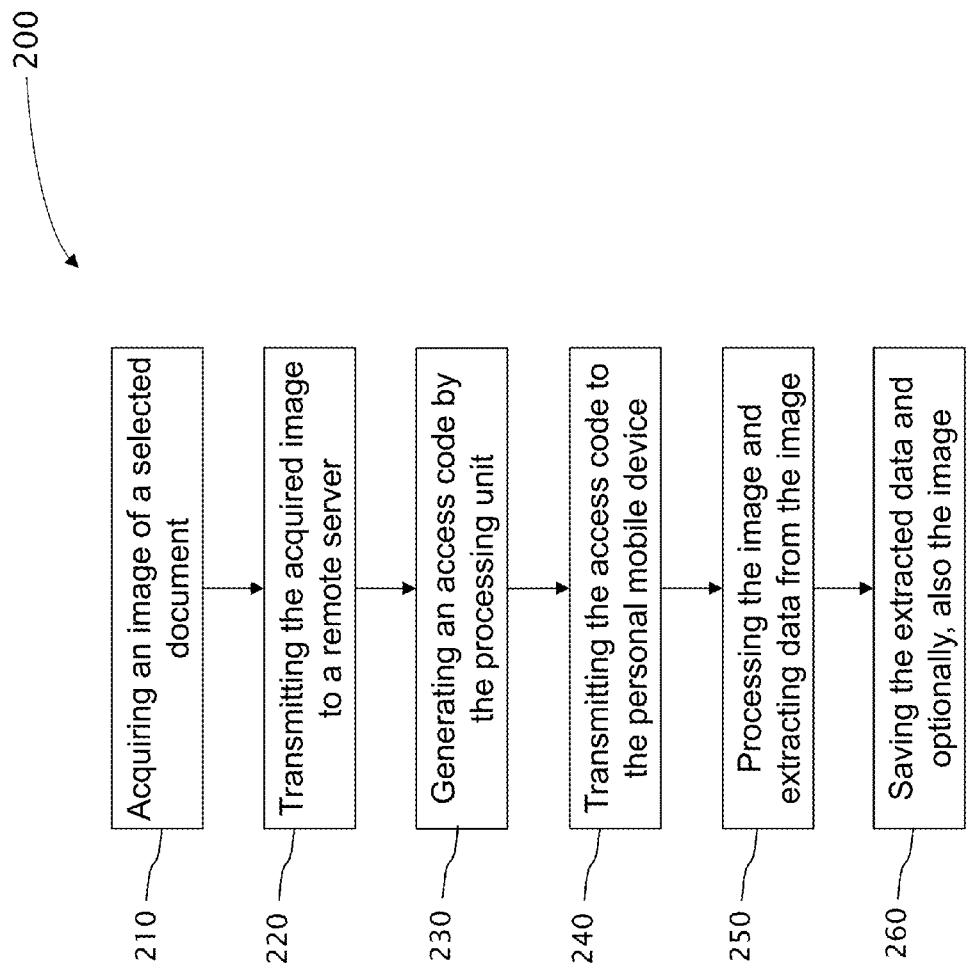
FIG. 2a shows a schematic flowchart diagram of a document processing method, according to some embodiments of the present invention.

Reference is now made to FIG. 2a, showing a schematic flowchart diagram of a document processing method 200 for serving a user 20$_i$ that desires to acquire at least one image frame of a document and have the at least one image frame transmitted to a remote server 102 for processing by a processing unit 112, according to embodiments of the present invention. User 20$_i$ is coupled with a personal mobile device 22, capable of acquiring at least one image frame and to transmit the at least one acquired image frame to remote server 102, by an image-transmission-management module 120, installed on the personal mobile device 22.

Once user 20$_i$ has activated image-transmission-management module 120$_i$, document processing method 200 proceeds as follows:

Step 210: acquiring at least one image frame of the selected document.
    User 20$_i$ acquires at least one image of the selected document using camera 24$_i$ of mobile device 22$_i$.

Step 220: transmitting the acquired image to the remote server.
    Image-transmission-management module 120$_i$ transmits the acquired at least one image frame of the document and the access code associated with the at least one image frame of the document to server 102.

Step 230: generating an access code.
    Processing unit 112 of remote server 102 generates an access code that will be associated with either image-transmission-management module 120$_i$, or with each image frame received from image-transmission-management module 120$_i$, or with a group of image frames received from image-transmission-management module 120$_i$.

Step 240: transmitting the generated access code to the personal mobile device.
    Document to server 102 transmits the generated access code to image-transmission-management module 120$_i$ for the usage of user 20$_i$.

Step 250: processing the image frame and extracting data from the image.
    Processing unit 112 of remote server 102 processes the at least one image frame of the document to thereby extract textual and/or image data from the at least one image frame.

Step 260: saving the extracted data and optionally, also the image.
    Processing unit 112 stores the extracted data in data repository unit 114 and optionally, also stores the at least one image frame of the document.
(end of vocal-commenting-posting method 200)

Figure 2B:
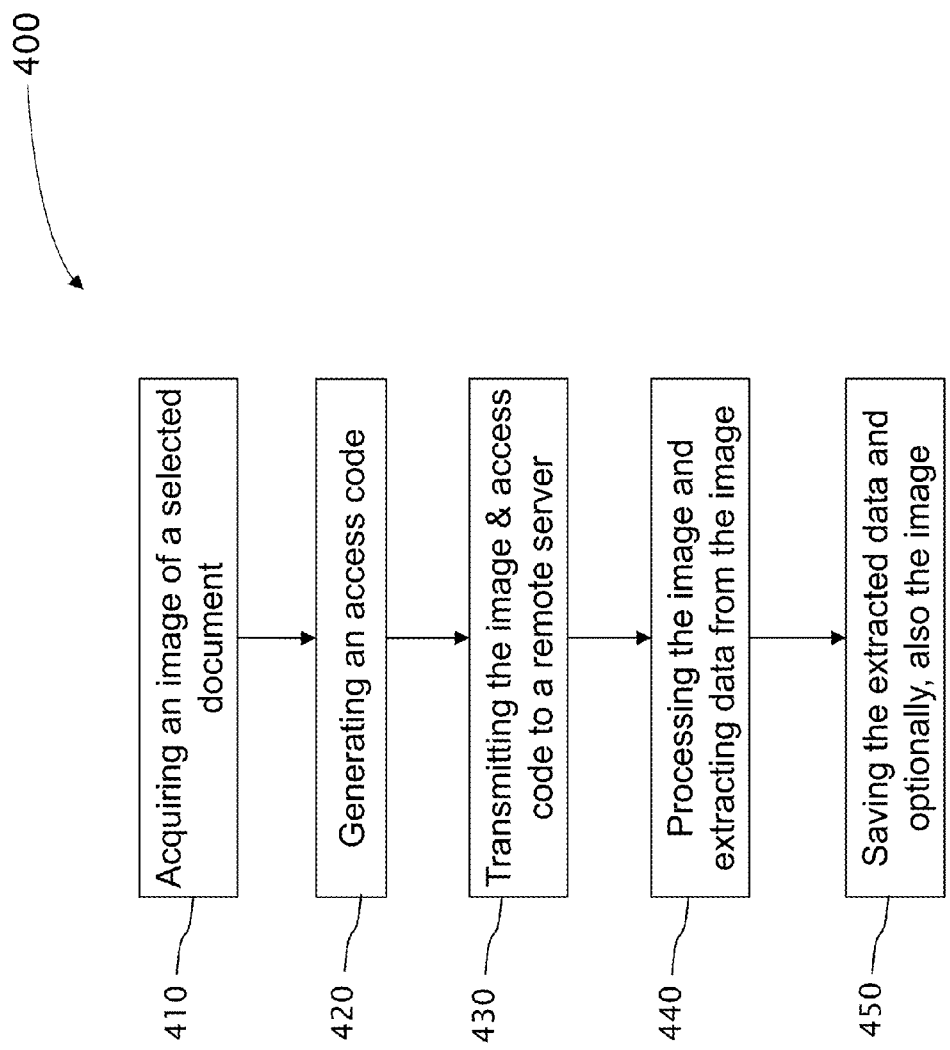
FIG. 2b shows a schematic flowchart diagram of a document processing method, according to other embodiments of the present invention.

Reference is now made to FIG. 2b, showing a schematic flowchart diagram of a document processing method 400 for serving a user 20$_i$ that desires to acquire at least one image frame of a document and have the at least one image frame transmitted to a remote server 102 for processing by a processing unit 112, according to embodiments of the present invention. User 20$_i$ is coupled with a personal mobile device 22, capable of acquiring at least one image frame and to transmit the at least one acquired image frame to remote server 102, by an image-transmission-management module 120, installed on the personal mobile device 22.

Once user 20$_i$ has activated image-transmission-management module 120$_i$, document processing method 400 proceeds as follows:

Step 410: acquiring at least one image frame of the selected document.
    User 20$_i$ acquires at least one image of the selected document using camera 24$i$ of mobile device 22$_i$.

Step 420: generating and uploading an access code.
    In some embodiments, image-transmission-management module 120$_i$ generates an access code that will be associated with the at least one image frame of the document. Alternatively, image-transmission-management module 120$_i$ assigns an access code that is associated with the hosting mobile device 22$_i$, to all image frames acquired by mobile device 22$_i$, to be transmitted to remote processing unit 112 for processing.

Step 430: transmitting image & access code to a remote server.
    Image-transmission-management module 120$_i$ transmits the acquired at least one image frame of the document and the access code associated with the at least one image frame of the document to server 102.

Step 440: processing the image frame and extracting data from the image.
    Processing unit 112 of remote server 102 processes the at least one image frame of the document to thereby extract textual and/or image data from the at least one image frame.

Step 450: saving the extracted data and optionally, also the image.
    Processing unit 112 stores the extracted data in data repository unit 114 and optionally, also stores the at least one image frame of the document.
(end of vocal-commenting-posting method 400)

Figure 3:
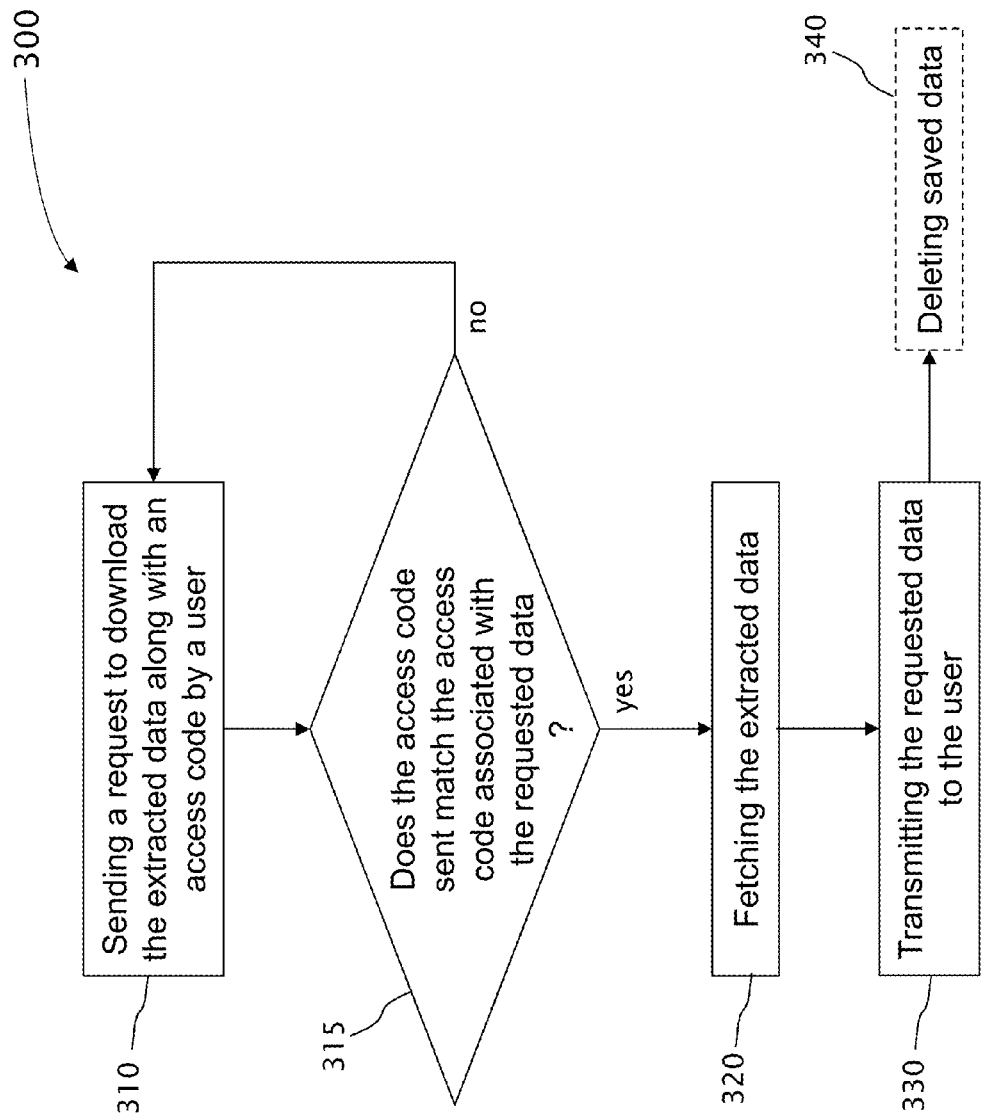
FIG. 3 shows a schematic flowchart diagram of an example retrieving method for retrieving the extracted data, according to an embodiment of the present invention, being a follow-up of the document processing method outlined in FIG. 2a or 2b.

A complementary method may then be activated to retrieve the extract data from remote server 102. Reference is now also made to FIG. 3, showing a schematic flowchart diagram of an example retrieving method 300 for retrieving the extracted data, according to an embodiment of the present invention. Method 300 proceeds as follows:

Step 310: sending a request to download the extracted data along with an access code by a user.
    A user uses a computerized device 130 to send a request to processing unit 112 of remote server 102, in order to obtain the extracted data generated in step 240 and stored in data repository unit 114 in step 250. The user sends along an access code to facilitate access to the extracted data.

Step 315: check if the sent access code sent matches the access code associated with the requested data.

Main processing unit 110 checks if the sent access code sent matches the access code associated with the requested data.

If the sent access code does not match the access code associated with the requested data, go to step 310.

Step 320: receiving comment's data.

Main processing unit 110 fetches the extracted data from data repository unit 114.

Step 330: transmitting the extracted data to the user.

Main processing unit 110 transmits the extracted data to the computerized device 130 of the user.

Step 340: deleting saved data.

Optionally, main processing unit 110 deletes the requested data from data repository unit 114. The deletion may be performed after a preconfigured time interval passes. The time interval may be measured from the storing of the extracted data in data repository unit 114 and/or from the transmission of the extracted data to the computerized device 130.

(end of vocal comment playing method 300)

In variations of the present invention, computerized device 130 and personal mobile device 22 are the same device.

Although the present invention has been described with reference to the preferred embodiment and examples thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the following claims.

What is claimed is:

1. A document processing system for remote processing an image frame of a document, comprising:
   a. a remote server, including:
      i. a processing unit; and
      ii. a data repository unit;
   and
   b. a personal mobile device, comprising;
      i. an image acquisition device for acquiring at least one image frame of a document;
      ii. a communication unit adapted to communicate with said processing unit via a wireless network;
      iii. an image-transmission-management module,
   wherein upon receiving said at least one image frame of a document by said remote server from said personal mobile device, via said wireless network, said processing unit extracts textual data, image data or both from said received at least one image frame to thereby create extracted data; associates an access code to said extracted data; and stores said at least one image frame, said extracted data and said associated access code in said data repository unit.

2. The document processing system of claim 1, wherein said access code is generated by said processing unit and sent to said image-transmission-management module.

3. The document processing system of claim 2, wherein said access code is uniquely assigned to said personal mobile device.

4. The document processing system of claim 2, wherein upon receiving said at least one image frame said access code is associated with each said received image frame.

5. The document processing system of claim 2, wherein upon receiving said at least one image frame said access code is associated with each sequence of said received image frames.

6. The document processing system of claim 1, wherein said access code is generated by said image-transmission-management module and sent to said remote server along with said at least one image frame.

7. The document processing system of claim 6, wherein said access code is associated with each said at least one image frame.

8. The document processing system of claim 6, wherein said access code is associated with each sequence of said at least one image frame.

9. The document processing system of claim 6, wherein said access code is uniquely assigned to said personal mobile device.

10. The document processing system of claim 1 further including at least one remote computerized device that is in communication flow with said remote server and wherein a user of said remote computerized device, upon requesting to obtain said at least one image frame from said remote server, provides said access code associated with said at least one image frame in order for said remote server to send said at least one image frame to said remote computerized device.

11. The document processing system of claim 10, wherein said remote computerized device is said personal mobile device.

12. A document processing method for remote processing an image frame of a selected document, the method comprising the steps of:
   a. providing a document processing system as in claim 2;
   b. by said image acquisition device, acquiring at least one image frame of a selected document;
   c. by said image-transmission-management module, transmitting said at least one image frame to said remote server;
   d. by said processing unit, providing an access code associated with said at least one image frame;
   e. by said processing unit, transmitting said access code to said image-transmission-management module;
   f. by said processing unit, processing said at least one image frame and thereby extract textual and/or image data from said at least one image frame; and
   g. by said processing unit, storing said extracted textual and/or image data from in said data repository unit.

13. The document processing method of claim 12, wherein said access code is uniquely assigned to said personal mobile device.

14. The document processing method of claim 12, wherein said access code is associated with said at least one image frame.

15. The document processing method of claim 12 further including the steps of:
   h. sending a request to obtain said at least one image frame from said remote server by a user using a remote computerized device that is in communication flow with said remote server;
   i. sending said access code associated with said at least one image frame to said remote server along with said request;
   j. by said processing unit, authenticating said access code; and
   k. upon determining that said received access code matches said access code associated with said at least one image frame, sending said at least one image frame to said remote computerized device.

16. The document processing method of claim 15 further comprising the step of deleting said at least one image frame after said sending said at least one image frame to said remote computerized device.

17. A document processing method for remote processing an image frame of a selected document, the method comprising the steps of:
   a. providing a document processing system as in claim 6;
   b. by said image acquisition device, acquiring at least one image frame of a selected document;
   c. by said image-transmission-management module, providing an access code associated with said at least one image frame;
   d. by said image-transmission-management module, transmitting said at least one image frame and associated access code to said remote server;
   e. by said processing unit, processing said at least one image frame and thereby extract textual and/or image data from said at least one image frame; and
   f. by said processing unit, storing said extracted textual and/or image data from in said data repository unit.

18. The document processing method of claim 17, wherein said access code is uniquely assigned to said personal mobile device and is sent by said image-transmission-management module to said remote server along with said at least one image frame.

19. The document processing method of claim 17, wherein said access code is uniquely assigned to said personal mobile device and is sent by said image-transmission-management module to said remote server along with said at least one image frame.

20. The document processing method of claim 17 further including the steps of:
   g. sending a request to obtain said at least one image frame from said remote server by a user using a remote computerized device that is in communication flow with said remote server;
   h. sending said access code associated with said at least one image frame to said remote server along with said request;
   i. by said processing unit, authenticating said access code; and
   j. upon determining that said received access code matches said access code associated with said at least one image frame, sending said at least one image frame to said remote computerized device.

* * * * *